United States Patent
Bremer et al.

(10) Patent No.: US 7,707,446 B2
(45) Date of Patent: *Apr. 27, 2010

(54) SYSTEM AND METHOD FOR MINIMIZED POWER CONSUMPTION FOR FRAME AND CELL DATA TRANSMISSION SYSTEMS

(75) Inventors: Gordon Bremer, Largo, FL (US); Thomas J. Bingel, Belleair Beach, FL (US); Chuck Coston, Largo, FL (US); Rafael S. Martinez, Clearwater, FL (US)

(73) Assignee: Summit Technology Systems LP, Bala Cynwyd, PA (US)

( * ) Notice: Subject to any disclaimer, the term of this patent is extended or adjusted under 35 U.S.C. 154(b) by 695 days.

This patent is subject to a terminal disclaimer.

(21) Appl. No.: 11/413,520

(22) Filed: Apr. 28, 2006

(65) Prior Publication Data

US 2006/0195712 A1    Aug. 31, 2006

Related U.S. Application Data

(63) Continuation of application No. 09/765,223, filed on Jan. 18, 2001, now Pat. No. 7,058,833.

(60) Provisional application No. 60/176,933, filed on Jan. 18, 2000.

(51) Int. Cl.
  *G06F 1/32* (2006.01)
(52) U.S. Cl. .................. 713/324; 713/300; 713/320
(58) Field of Classification Search ......... 713/320–324, 713/300
  See application file for complete search history.

(56) References Cited

U.S. PATENT DOCUMENTS

| | | | |
|---|---|---|---|
| 5,414,863 A | 5/1995 | Lee et al. | |
| 5,587,672 A * | 12/1996 | Ranganathan et al. | 326/93 |
| 6,104,937 A | 8/2000 | Fujimoto | |
| 6,144,695 A | 11/2000 | Helms et al. | |
| 6,256,743 B1 | 7/2001 | Lin | |
| 6,345,362 B1 | 2/2002 | Bertin et al. | |
| 6,378,026 B1 | 4/2002 | Chan et al. | |
| 6,580,785 B2 | 6/2003 | Bremer et al. | |
| 6,691,233 B1 | 2/2004 | Gannage et al. | |
| 6,711,207 B1 | 3/2004 | Amrany et al. | |
| 7,058,833 B1 | 6/2006 | Bremer et al. | |

FOREIGN PATENT DOCUMENTS

JP   11262067 A   9/1999

OTHER PUBLICATIONS

"Advanced Configuration and Power Interface Specification", Jul. 27, 2000, Revision 2.0, pp. 21-22.*

* cited by examiner

*Primary Examiner*—Mark Connolly
*Assistant Examiner*—Paul B Yanchus, III
(74) *Attorney, Agent, or Firm*—Woodcock Washburn LLP

(57) ABSTRACT

The present invention provides for a system and method for reducing power consumption in frame and cell data transmission systems. A transmitter power manager powers down (turns off) selected elements of a transmitter system during periods of transmitter inactivity. The transmitter power manager system detects incoming communication signals which are to be transmitted by the transmitter, and at the appropriate time, powers up (turns on) the selected elements which are controlled by the transmitter power manager.

28 Claims, 7 Drawing Sheets

SYSTEM AND METHOD FOR MINIMIZED POWER CONSUMPTION FOR FRAME AND CELL DATA TRANSMISSION SYSTEMS

CROSS REFERENCE TO RELATED APPLICATION

This application is a continuation of U.S. patent application Ser. No. 09/765,223, filed Jan. 18, 2001, now U.S. Pat. No. 7,058,833, which claims priority to provisional application serial No. 60/176,933, filed Jan. 18, 2000. Both applications are hereby incorporated herein by reference.

TECHNICAL FIELD

The present invention relates generally to data communications, and more particularly, to a system and method for managing power consumption in a transmitter and in associated signal generating circuitry.

BACKGROUND OF THE INVENTION

With the increasing bandwidth demands from the advent of the Internet, service providers have looked for ways to increase data transmission performance over the copper wire local loop transmission lines that connect telephone central offices (COs) to customer premises (CPs). In conventional telephony networks, customer premises equipment (CPE) are coupled to CO switches over the above mentioned transmission lines, which are commonly known as "local loops," "subscriber lines," "subscriber loops," "loops," or the "last mile" of the telephone network. In the art, the term "line" and "loop" are used interchangeably, both terms referring to the copper wire pair used in a typical telephone transmission line conductor. Historically, the public switched telephone network (PSTN) evolved with subscriber loops coupled to a telephone network with circuit-switched capabilities that were designed to carry analog voice communications. "Central office" or "CO" means any site where a subscriber loop couples to a telephony switching unit, such as a public switched telephone network (PSTN), a private branch exchange (PBX) telephony system, or any other location functionally coupling subscriber loops to a telephony network. Digital service provision to the CP is a more recent development. With it, the telephone network has evolved from a system capable of only carrying analog voice communications into a system that can simultaneously carry voice and digital data.

Because of the prohibitive costs of replacing or supplementing existing subscriber loops, technologies have been implemented that utilize existing subscriber loops to provide easy and low cost migration to digital technologies. Subscriber loops capable of carrying digital signals are known as digital subscriber lines (DSLs). Various digital technologies provide customers with additional flexibility and enhanced services by utilizing frequency-division multiplexing (FDM) and/or echo-canceling (EC) and/or time-division multiplexing (TDM) techniques to fully exploit the transmission capability of a subscriber loop. These newer DSL technologies provide digital service to the customer premises without significantly interfering with the existing plain old telephone service (POTS) equipment and wiring by utilizing portions of the available frequency spectrum not used by a POTS signal. These portions of the frequency spectrum are often referred to as "logical channels." Logical channels within a subscriber line that carry digital signals are known as "DSL channels," while logical channels within a subscriber line which carry POTS analog signals are known as "POTS channels."

DSL technologies, such as but not limited to integrated services digital network (ISDN), high-bit-rate digital subscriber line (HDSL), HDSL2 and symmetric digital subscriber line (SDSL), utilize echo-canceled pulse amplitude modulation to create a baseband data transmission spectrum and therefore do not coexist with a POTS signal which typically utilizes the 0-4 kilo-hertz (KHz) portion of the available frequency spectrum.

Other DSL technologies coexist with POTS by frequency-division multiplexing (FDM) a single data signal onto a logical channel above (at higher frequencies than) the 0 KHz to 4 KHz frequency range used by the analog POTS signals. Such multiplexing techniques and terminology are common to those skilled in the art, and are not described in detail herein. Examples of DSL technologies compatible with POTS include, but are not limited to, Asymmetric Digital Subscriber Line (ADSL), Rate Adaptive Digital Subscriber Line (RADSL), Very High Speed DSL (VDSL), Multiple Virtual Lines (MVL™) and Tripleplay™. Communications systems employing DSL-over-POTS technology may frequency multiplex a plurality of data signals and a single POTS signal onto a single subscriber line. ADSL system employing time-division multiplexing would multiplex a plurality of data signals onto a single logical channel with each different data signal allocated to a predefined portion of time in a predefined, repeating time period. Note that an advantage of TDM is that the transmitter does not actively transmit at all times.

Figure 1:
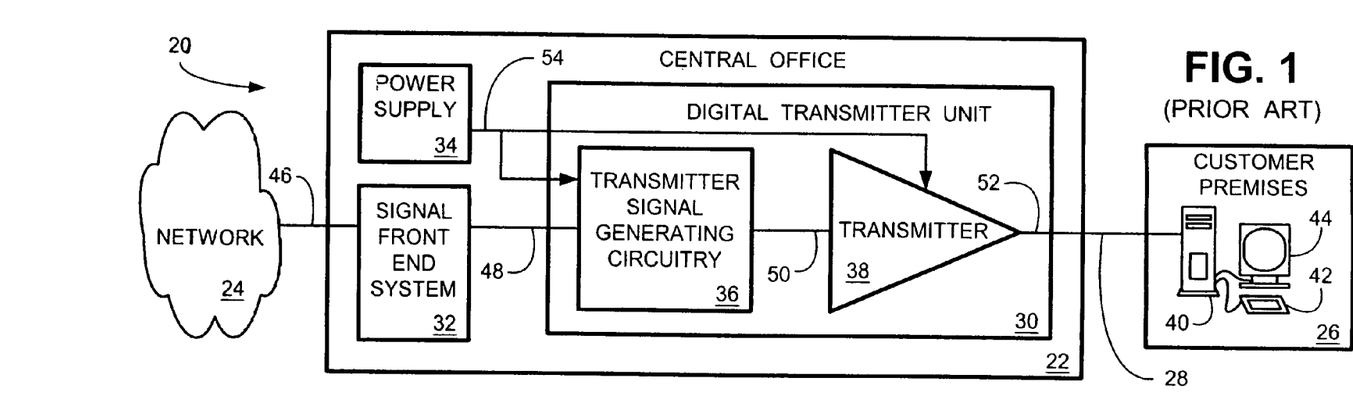
FIG. 1 is a block diagram illustrating a digital transmitter unit employed in a conventional telephony system such that the digital transmitter unit may transmit to a personal computer (PC) residing at the customer premises.

FIG. 1 is a simplified illustrative block diagram of a portion of an existing telephony system 20 which includes a telephone company central office (CO) 22 coupled to communication system network 24 and coupled to a customer premises (CP) 26 via a single subscriber loop 28. Subscriber loop 28 may be any suitable connection for communicating electrical signals, but is typically a copper wire pair, as is well known in the art, that was originally designed to carry a 0-4 KHz analog voice channel (POTS signal). When a copper wire pair is used for data signal transmission, the wire pair is often referred to as a digital subscriber loop (DSL).

Located within the CO 22 is the digital transmitter unit 30, signal front end system 32 and power supply 34. Digital transmitter unit 30 includes at least a transmitter signal generating circuitry 36 and a transmitter 38. Signal front end system 32 detects incoming communication signals from network 24, via connection 46, which are to be transmitted to CP 26. Signal front end system 32 performs the necessary signal processing of the communication signal received from network 24, and passes the communication signal to transmitter signal generation circuitry 36, via connection 48. Transmitter signal generation circuitry 36 further process the communication signal; a common example known to those skilled in the art is a DSP (Digital Signal Processor). Such processing may include modulation of the communication signal for transmission to customer premises 26. Transmitter signal generation circuitry 36 passes the processed communication signal to transmitter 38, via connection 50. Transmitter 38 provides the necessary communication signal amplification so that a communication signal having the proper signal strength can be transmitted, via connection 52, onto subscriber loop 28.

Power supply 34 provides the necessary power to transmitter 38, via connection 54. Also, power supply 34 provides power to components residing in the transmitter signal generation circuitry via connection 54. Power supply 34 also provides power to other components residing in the CO 22, however, such connections providing power to these other components are not shown for convenience of illustration.

Many other components typically reside in CO 22 which are not illustrated in FIG. 1 for convenience. For example, no digital receiver circuitry, POTS signal circuitry, couplers between the POTS and the digital systems are shown in FIG. 1. Such components are not described in detail herein as these components are well known in the art. Furthermore, not all of the components residing in the signal front end system 32, the transmitter signal generating circuitry 36 or transmitter 38 are described herein in detail or illustrated in FIGS. 1-8 other than to the extent necessary.

Located within the CP 26 may be a plurality of digital equipment devices which transmit and receive data signals over subscriber loop 28. For convenience of illustration, a personal computer (PC) 40 is shown residing in CP 26 and coupled to subscriber loop 28. Illustrative examples of other digital equipment devices include, but are not limited to, facsimile (FAX) machines, set top boxes, internet appliances, computers or the like. PC 40 includes a modem (not shown), or the like, coupled to subscriber loop 28. PC 40 may communicate with a plurality of other digital equipment devices (not shown) via an Ethernet (not shown), other local access network (LAN), or the like (not shown). PC 40 includes user interface devices, such as keyboard 42 and/or viewing screen 44, to interface with a user (not shown).

A modem (not shown), typically residing in PC 40, decodes a data signal received from the digital transmitter unit 30 over the subscriber loop 28. The modem also transmits communication signals onto the subscriber loop 28 which have been generated by PC 40 or other similarly functioning digital device residing in the CP 26. Typically data is communicated using a communication signal that has been modulated. Modulation schemes used to communicate between CO 22 and CP 26 may include, but are not limited to, carrierless amplitude/phase modulation (CAP), quadrature amplitude modulation (QAM), Discrete Multi Tone (DMT) or pulse amplitude modulation (PAM), and are commonly known in the art and are not described in detail herein.

Prior art digital communication systems, like the signal front end system 32 and the digital transmitter unit 30 illustrated in FIG. 1, are often added into an existing CO 22 so that the digital communication system can utilize existing POTS facilities, such as power supplies, building structures, grounding and protection facilities, etc. Also, it may be desirable to expand already existing digital communication facilities residing in the CO 22. However, electrical code requirements, regulations and/or rules pertaining to the heat generated by digital communication system components may limit the size of the digital communication system addition or expansion. Such code requirements specify the maximum heat generation allowed per unit size of floor space and/or per unit size of cabinet volume. In other situations, limited physical space may be available within the CO 22 for digital communication system additions or expansions. Consequently, a more compact construction of the digital communication system components may be desirable. Also, available power supplies and the load carrying capacity of existing facilities, which provide the power to the digital communication system additions or expansions, may be limited. Therefore, it is desirable to reduce power consumption in at least some of the components of a digital communication system. Reducing power consumption would facilitate a more compact construction of an electrical code compliant digital communication system addition or expansion.

SUMMARY OF THE INVENTION

Power consumption in frame and cell data transmission systems in a communication environment may be reduced by the transmitter power manager system. The transmitter power manager system powers down selected elements of a transmitter system during periods of transmitter inactivity. The transmitter power manager system detects incoming communication signals which are to be transmitted by the transmitter, and at the appropriate time, powers up (turns on) the elements which are controlled by the transmitter power manager.

A transmitter power manager system employs a data detector and power enabling circuitry. The data detector is coupled to an element residing in the communication system and detects activity corresponding to an incoming communication signal which is to be transmitted. Upon detection of activity in the preselected element or connection, the data detector provides a control signal to the power enabling circuitry. The power enabling circuitry is coupled to selected elements in the transmitter and the transmitter signal generating circuitry which may be powered down during periods of transmitter inactivity. Upon receiving the control signal which indicates the presence of an incoming communication signal which is to be transmitted, the power enabling circuitry provides power to the selected elements so that the selected elements are fully powered, stabilized and ready to transmit the communication signal. When the communication signal has been transmitted, the data detector detects the end of the transmission and provides a control signal to the power enabling circuitry such that the selected components are then powered down. That is, during periods of transmitter inactivity, selected elements residing in the transmitter and/or the transmitter signal generating circuitry are powered down, and when incoming communication signal which are to be transmitted are detected, the power enabling circuitry turns on the selected elements.

BRIEF DESCRIPTION OF THE DRAWINGS

The transmitter power manager system, as defined in the claims, can be better understood with reference to the following drawings. The components within the drawings are not necessarily to scale relative to each other, emphasis instead being placed on clearly illustrating the principles of the transmitter power manager system and method.

For convenience of illustration, elements among the several figures that are similar to each other may bear the same reference numerals. Such elements bearing the same reference numerals may be considered to be like elements, however, since these like numeraled elements are incidental to the operation of the present invention which utilizes existing portions of a communication network, one skilled in the art will realize that like numeraled elements among the several figures need not be identical, as any variations of such elements will not adversely affect the functioning and performance of the present invention. Furthermore, like elements that are like-numbered may be described in detail only in the first instance of occurrence, and not described in detail again when occurring in subsequent figures.

DETAILED DESCRIPTION OF THE INVENTION

A. Overview of the Transmitter Power Manager System and Method

Figure 2:
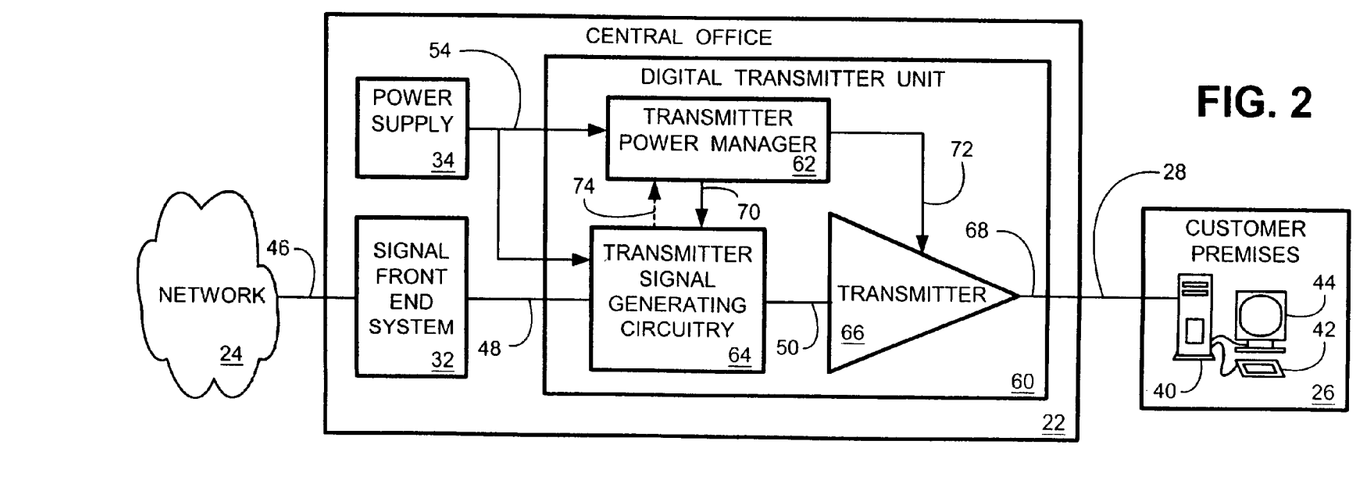
FIG. 2 is a block diagram illustrating a transmitter power manager system implemented in the digital transmitter unit of FIG. 1.

When a plurality of communication connections are coupled to a common communication device, it may be desirable to reduce power consumption in at least some of the components of the communication system. FIG. 2 is a simplified block diagram illustrating a transmitter power manager system and method of the present invention implemented in a digital transmitter unit 60. For convenience of illustration, and for convenience of explaining the operation and functionality of the present invention, the transmitter power manager system and method is discussed in the context of providing service to a single customer premises 26. Digital transmitter unit 60 is shown as coupled to subscriber loop 28, thereby providing connectivity to PC 40 residing at customer premises 26. In an actual telephony system 20, central office 22 would typically be connected to a plurality of customer premises (not shown) via a plurality of subscriber loops (not shown). Thus, the present invention provides a system and method for controlling power in a plurality of digital transmitters transmitting communication signals to a plurality of customer premises.

A signal front end system 32 and a power supply 34 are coupled to a digital transmitter unit 60, via connections 48 and 54, respectively. Digital transmitter unit 60 includes transmitter power manager 62, transmitter signal generating circuitry 64 and transmitter 66. Power supply 34 is coupled to the transmitter power manager 62 and to the transmitter signal generating circuitry 64, via connection 54. Incoming communication signals destined for PC 40 residing in customer premises 26 are provided to the digital transmitter unit 60 by the front end system 32, via connection 46. Transmitter signal generating circuitry 64 further processes the incoming communication signal. Transmitter signal generation circuitry 64 passes the processed communication signal to transmitter 66, via connection 50. Transmitter 66 provides the necessary communication signal generation and amplification so that the communication signal can be transmitted onto subscriber loop, via connection 68, having the proper signal characteristics and strength.

Transmitter power manager 62 is coupled to transmitter signal generating circuitry 64, via connection 70, and to transmitter 66, via connection 72. Transmitter power manager 62 detects the presence of incoming communication signals which are to be transmitted to PC 40, via connection 74. Transmitter power manager 62 powers up (turns on) and powers down (turns off) selected components residing in the transmitter signal generating circuitry 64 and the transmitter 66 by enabling power to the selected components. These selected components are powered down when there is no communication signal to be transmitted to PC 40 (or a similar communication device residing in customer premises 26). That is, transmitter power manager 62 powers down selected components of the digital transmitter unit 60 during the periods of transmitter inactivity. In prior art applications of a digital transmitter unit 30 (FIG. 1), all components would remain on at all times. Providing power to all components at all times in prior art digital transmitter systems unnecessarily generates heat and utilizes power during those times when many of the digital transmitter components are not being operated to transmit a communication signal.

Summarizing, transmitter power manager 62 detects the presence of an incoming communication signal which is to be transmitted by monitoring a selected element or connection of the transmitter signal generation circuitry 64 (or other suitable location). During periods of time when communication signal is to be transmitted, transmitter power manager 62 enables power to the selected components residing in the transmitter signal generating circuitry 64 and the transmitter 66 such that the communication signal may be transmitted. During periods of transmitter inactivity (when the communication signals are no longer transmitted), the transmitter power manager 62 powers down the selected components.

B. Components Residing In A Transmitter Power Manager

Figure 3:
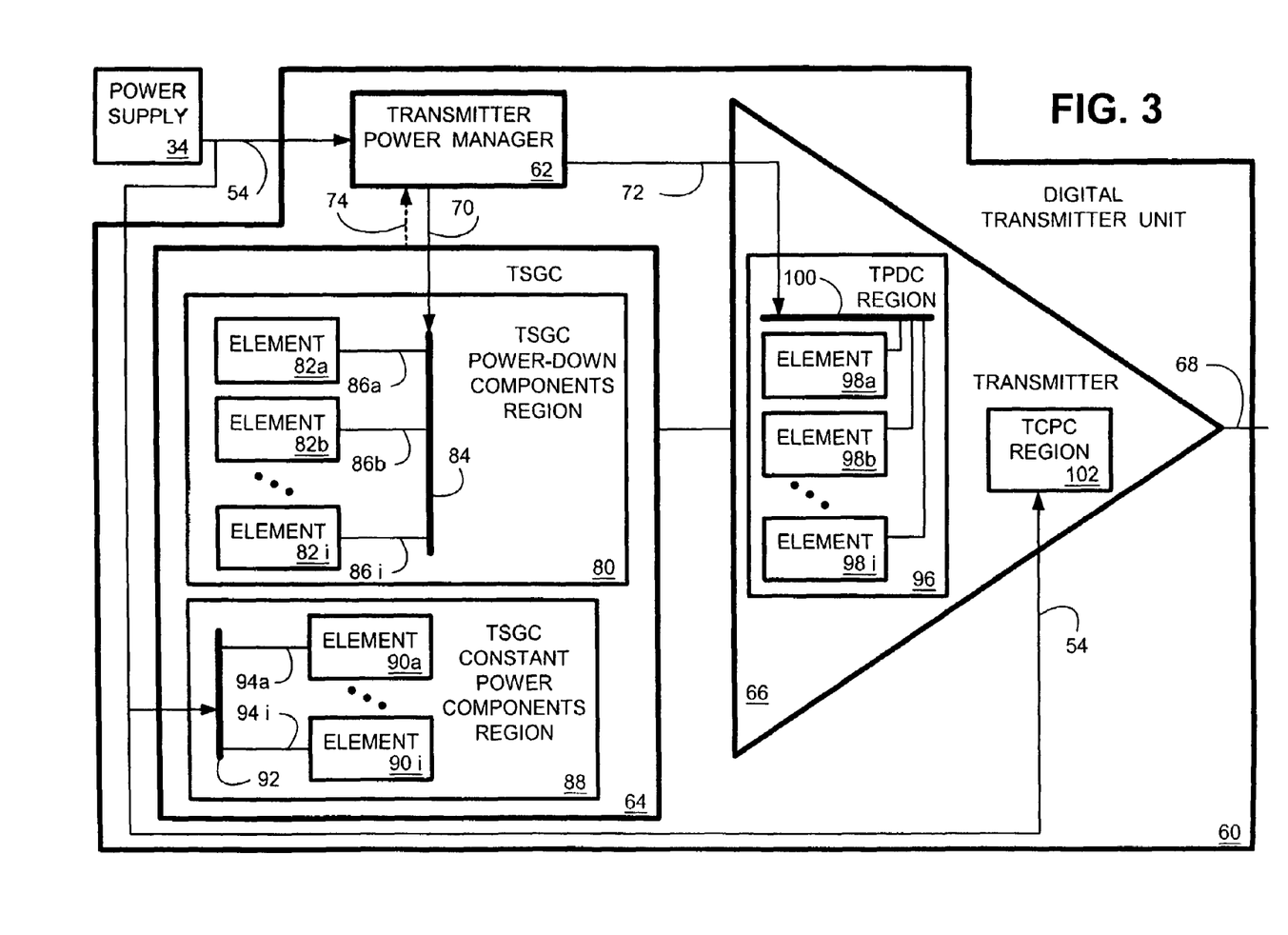
FIG. 3 is a block diagram illustrating selected components residing in the digital transmitter unit of FIG. 2.

FIG. 3 illustrates additional detail of components residing in an embodiment of the transmitter signal generating circuitry (TSGC) 64 and the transmitter 66. TSGC 64 is illustrated as having a plurality of elements 82a-82i residing in the TSGC power-down components region 80 which are to be powered down by the transmitter power manager 62 during periods of time when the transmitter 66 is inactive. For convenience of illustration, elements 82a-82i are shown connected to a common power supply bus 84, via connections 86a-86i. Alternatively, elements 82a-82i could be directly coupled to the transmitter power manager 62.

Elements 90a-90i, which are to be continuously powered by power supply 34, reside in the TSGC constant power components region 88. These continuously powered elements 90a-90i are coupled to a common power supply bus 92, via connections 94a-94i, respectively. Power supply bus 92 is coupled to power supply 34 via connection 54. These elements 90a-90i would typically be powered at all times, regardless of whether or not the transmitter 66 was actively transmitting data.

Transmitter 66 is illustrated as having a plurality of elements 98a-98i residing in a transmitter power-down components (TPDC) region 96 which are powered down by the transmitter power manager 62 during periods of transmitter 66 inactivity. For convenience of illustration, elements 98a-98i are shown connected to a common power supply bus 100. Power supply bus 100 is coupled to the transmitter power manager 62 via connection 72. Alternatively, elements 98a-98i could be directly coupled to the transmitter power manager 62.

Some elements (not shown) residing in transmitter 66, such as, but not limited to, voltage or current references, may consume little power but have significant time delay requirements for precise operation, and should be continuously powered by power supply 34. These elements would reside in the transmitter constant power components (TCPC) region 102 and are coupled to power supply 34 via connection 54. These elements would typically be powered at all times, regardless of whether or not the transmitter 66 was actively transmitting data.

Figure 4:
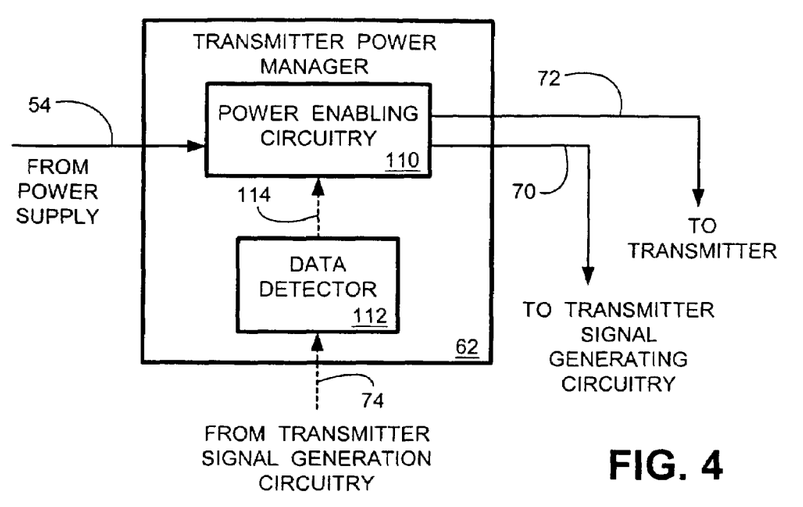
FIG. 4 is a simplified block diagram illustrating components residing in the transmitter power manager of FIGS. 2 and 3.

FIG. 4 illustrates selected components residing in the transmitter power manager 62; power enabling circuitry 110 and data detector 112. Power enabling circuitry 110 is coupled to the power supply 34 (FIG. 3) via connection 54. Data detector 112 is coupled to the transmit signal generation circuitry 64 via connection 74 (see also FIGS. 2 and 3). When data detector 112 detects an incoming communication signal which is to be transmitted to PC 40 (FIG. 2), data detector 112 provides a control signal to the power enabling circuitry 110, via connection 114. The control signal provided by data detector 112 actuates the power enabling circuitry 110 such that power is enabled to the elements 82a-82i residing in the TSGC power-down components region 80 (FIG. 3), via connection 70, and to the elements 98a-98i (FIG. 3) residing in the TPDC region 96 (FIG. 3), via connection 72.

Data detector 112 may be implemented using well known components and methods employed in the art of detecting communication signals. Detailed operation of individual components used in data detector 112 are not described in detail herein, other than to the extent necessary to understand the operation and functioning of these components when employed as part of the transmitter power manager 62. One skilled in the art will realize that data detector 112, or other suitable communication signal detectors, may be implemented using well known devices, and that such devices are too numerous to conveniently describe in detail herein. Any such well known data detector 112 may be implemented in a transmitter power manager 62 without departing substantially from the functionality and operation of the present invention. Furthermore, for convenience of illustration in FIG. 4, data detector 112 is shown residing in the transmitter power manager 62. Data detector 112 may also reside in alternative convenient locations outside of the transmitter power manager 62, as components of other systems, or as a stand alone dedicated data detector without adversely affecting the operation and functionality of the transmitter power manager 62. Any such variations in a data detector 112, or transmitter power manager 62, which utilizes the system and method of the present invention are intended to be within the scope of this disclosure and to be protected by the accompanying claims.

C. An Embodiment of the Power Enabling Circuitry

Figure 5:
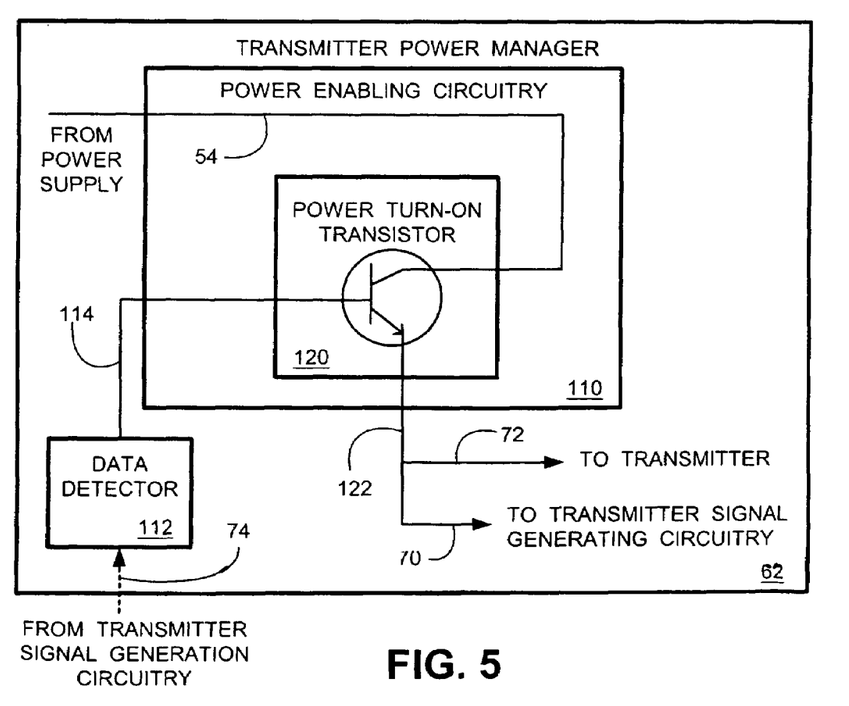
FIG. 5 is a block diagram illustrating components residing in an embodiment of the power enabling circuitry of FIG. 4.

FIG. 5 is a block diagram illustrating selected components for an exemplary embodiment of the power enabling circuitry 110. Power enabling circuitry 110 includes at least a power turn-on transistor 120. When data detector 112 detects an incoming communication signal which is to be transmitted by the transmitter 66 (FIG. 3), the data detector 112 generates a control signal on connection 114 such that the power turn-on transistor 120 is conducting. When power turn-on transistor 120 is conducting, current is permitted to flow from the power supply 34 ( FIGS. 2 and 3), via connection 54, through the power turn-on transistor 120 and out over connection 122. Connection 122 is coupled to connection 72, so that the elements 98a-98i in the TPDC region 96 of transmitter 66 (FIG. 3) are supplied the necessary power to operate when the power turn-on transistor 120 is conducting. Similarly, connection 122 is coupled to connection 70 so that elements 82a-82i residing in the TSGC power-down components region 80 of the transmit signal generation circuitry 64 (FIG. 3) are provided power. In the embodiment illustrated in FIG. 5, the power turn-on transistor 120 is sized such that the current rating of the power turn-on transistor 120 is rated to carry at least full load current for the aggregation of elements 82a-82i and elements 98a-98i.

Figure 6:
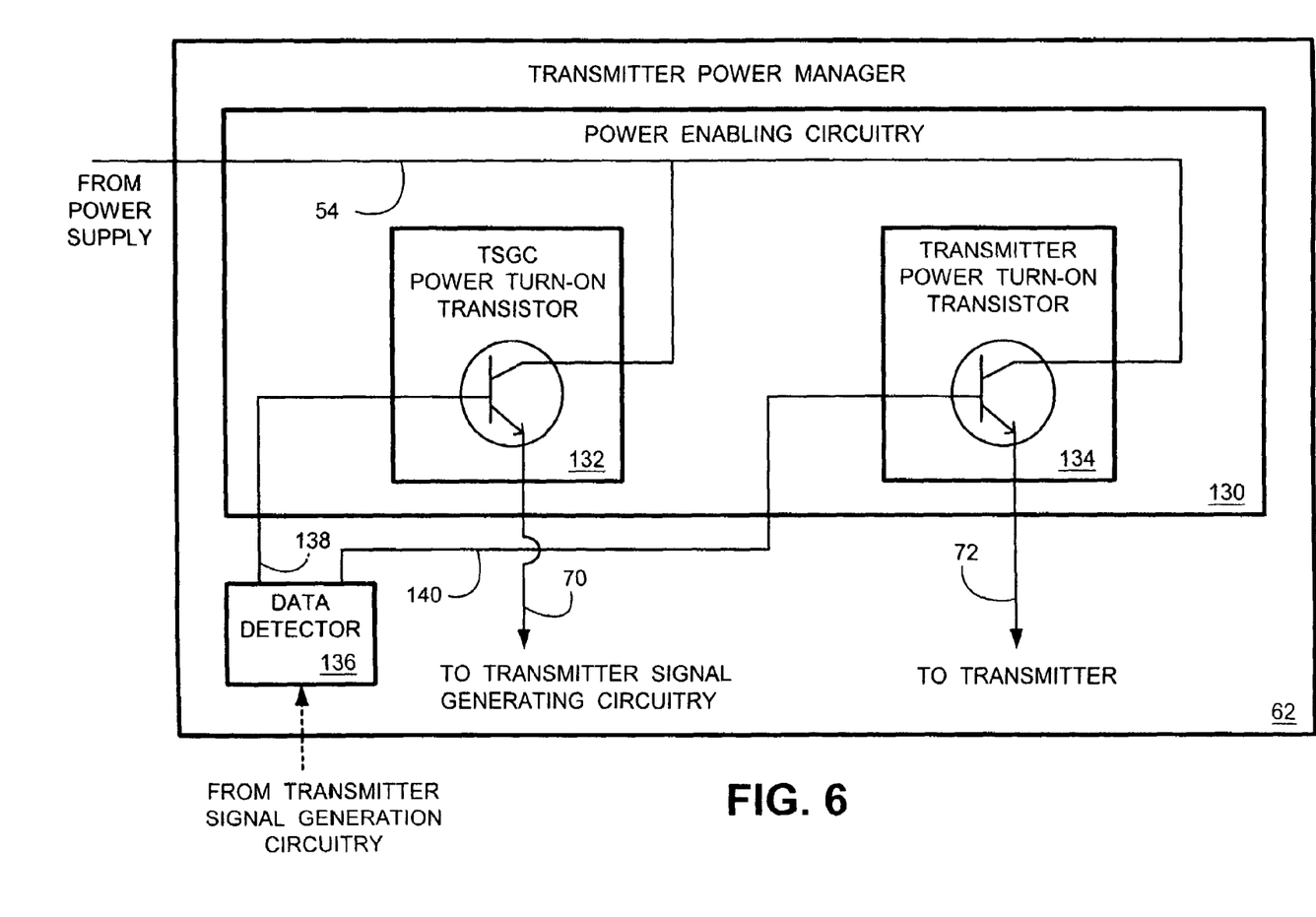
FIG. 6 is a block diagram illustrating components residing in another embodiment of the transmitter power manager.

In some applications, it may be desirable to utilize a plurality of power turn-on transistors in the power enabling circuitry 130. FIG. 6 illustrates one such exemplary embodiment having two power turn-on transistors; a TSGC power turn-on transistor 132 and a transmitter power turn-on transistor 134 residing in the power enabling circuitry 130. The TSGC power turn-on transistor 132 is coupled to power supply bus 84 in the TSGC power-down components region 80 of the transmit signal generation circuitry 64 (FIG. 3), via connection 70, such that elements 82a-82i are powered when the TSGC power turn-on transistor 132 is conducting. Similarly, transmitter power turn-on transistor 134 is coupled to power supply bus 100 residing in the TPDC region 96 of transmitter 66 (FIG. 3), via connection 72, such that when the transmitter power turn-on transistor 134 is conducting the elements 98a-98i are powered.

Data detector 136 provides the appropriate control signals to the TSGC power turn-on transistor 132, via connection 138, and to the transmitter power turn-on transistor 134, via connection 140. The TSGC power turn-on transistor 132 is sized to provide at least the full load current requirements of the aggregation of elements 82a-82i. Similarly, the transmitter power turn-on transistor 134 is sized to provide at least the full load current requirements of elements 98a-98i. This two transistor configuration would be desirable in applications where the total power requirements of the elements to be turned on during periods of transmitter activity exceed the available current rating of a single power turn-on transistor. In applications where both the TSGC power turn-on transistor 132 and the transmitter power turn-on transistor 134 are to be turned on at the same time, a single control signal could be provided to both transistors via a single connection (not shown).

Additionally, in some applications, it may be desirable to power up the elements in a cascading-like manner. That is, upon detection of the communication signal which is to be transmitted, data detector 136 might first actuate the TSGC power turn-on transistor 132 to the conducting state, and then after a predefined delay, actuate the transmitter power turn-on transistor 134 to the conducting state. In other applications, it may be desirable to turn on the transmitter power turn-on transistor 134 before the TSGC power turn-on transistor 132. Thus, as illustrated in FIG. 6, data detector 136 individually controls the TSGC power turn-on transistor 132 via connection 138, and individually controls the transmitter power turn-on transistor 134 via connection 140. A cascading approach to the control of the power turn-on transistors 132 and 134 may be desirable when some elements require a relatively longer stabilization time before they may be operated. A cascading approach may also be desirable when the delay time of the communication signal as it propagates from element to element is sufficiently long to warrant the delayed turn-on of selected elements.

Additionally, for ease and simplification of the explanation of the operation and functioning of the transmitter power manager 62, transistors shown in FIGS. 5 and 6 are illustrated as NPN-type bipolar junction transistors (BJT). The transistors 120, 132 and/or 134 residing in a transmitter power manager 62 may alternatively be any suitable transistor which is bias controlled. For example, but not limited to, such transistors may include field effect transistors (FETs), junction type FETs (JFETs), PNP BJTs or may even be other active devices such as a vacuum tube amplifier. When these components are employed in a transmitter power manager 62, the operation and functionality of the transmitter power manager 62 is substantially the same as described above. That is, the transmitter power manager 62 operates to turn on or turn off predefined elements in the transmitter and/or the transmitter signal generating circuitry. Any such alternative embodiments of a transmitter power manager 62 employing such transistors are intended to be within the scope of this disclosure and to be protected by the accompanying claims for the present invention.

Also, for ease and simplification of the explanation of the operation and functioning of the transmitter power manager 62, transistors shown in FIGS. 5 and 6 could typically be expected to be coupled to at least one resistor. Such resistors are not shown since a detailed explanation of the purpose of such resistors is not necessary for an understanding of the operation and functionality of the present invention. As is well known in the art, resistors coupled to the transistors may be employed for circuit protection, for controlling voltages applied to the transistors, for controlling current flow through transistors, and/or for other functions not specifically related to the present invention. Any such alternative embodiments of a transmitter power manager 62 employing such resistors are intended to be within the scope of this disclosure and to be protected by the accompanying claims for the present invention.

D. Detection of a Communication Signal to be Transmitted

Figure 7:
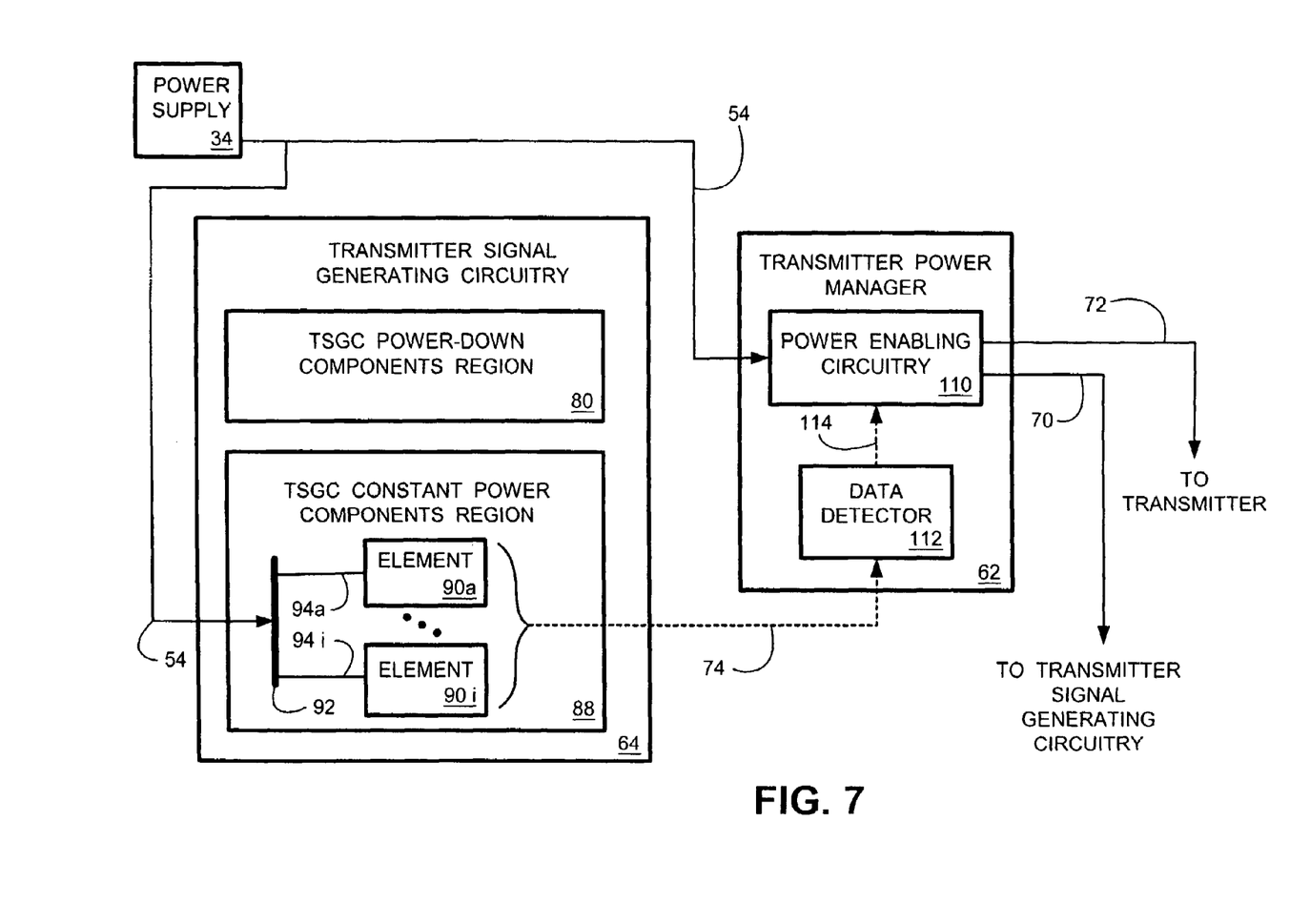
FIG. 7 is a simplified illustrative block diagram illustrating the coupling of the data detector of FIGS. 4-6 to selected elements residing in the transmitter signal generating circuitry of FIG. 3.

FIG. 7 is a simplified block diagram illustrating how the data detector 112 (see also FIG. 5) could be configured to detect an incoming communication signal which is to be transmitted. As discussed above, the transmitter signal generation circuitry 64 has a plurality of elements 90a-90i residing in the TSGC constant power components region 88 (see also FIG. 3) which are to be powered at all times. Generally, an incoming communication signal which is to be transmitted first enters the transmitter signal generation circuitry 64 for processing, as discussed above. Signal processing would be initially processed by the elements 90a-90i residing in the transmitter signal generating circuitry 64 in a predefined serial manner. That is, the communication signal would be propagated from one element to the next element as the communication signal is processed. This serial propagation of the incoming communication signal through the various elements residing in the transmitter signal generating circuitry 64 introduces an inherent time delay in the propagation of the communication signal. After the communication signal has been processed by the transmitter signal generating circuitry 64, the processed communication signal is passed to transmitter 66 (FIG. 3). As discussed above, transmitter 66 then amplifies the communication signal to a suitable signal strength for transmission out to the subscriber loop 28 (FIG. 2) for delivery to the communication equipment residing at customer premises 26, such as PC 40 (FIG. 2).

A total turn-on time can be determined by summing the time required for detection of the communication signal by data detector 112, the time required for generation of the appropriate control signal by data detector 112, the time required for the power turn-on transistors (see FIGS. 5 and 6) residing in the power enabling circuitry 110 (see also FIG. 5) to conduct, and the time required to turn on and stabilize a selected one of the elements 82a-82i and 98a-98i (FIG. 3). In an application where the transmitter power manager 62 is to have all elements 82a-82i and elements 98a-98i (FIG. 3) turned on at the same time, the total turn-on time is based upon the longer of a) the first element of the elements 82a-82i and 98a-98i which is to process the incoming communication signal, or, b) the element which has the longest turn-on and stabilization time.

For example, the communication signal may be processed by the plurality of elements 90a-90i in a serial fashion, and then be processed by element 82a (the first powered down element which processes the communication signal). Knowing the individual time delay associated with each one of the elements 90a-90i, a suitable element within the series of elements 90a-90i, or a suitable connection, is selected and monitored for activity such that the detection of activity (signal processing by the selected element or communication over the selected connection) would indicate to data detector 112 the presence of an incoming communication signal. Thus, an incoming communication signal would be detected by data detector 112, via connection 74, and the power turn-on process would be initiated in sufficient time so that all elements 82a-82i in the TSGC power down components region 80 and all elements 98a-98i in the TPDC region 96 (FIG. 3) are fully powered and stabilized in sufficient time to process the incoming communication signal.

As mentioned above, it may be desirable to turn on the various elements in the digital transmitter unit 60 (FIG. 3) in a cascading fashion. If a substantial delay time occurs as an incoming communication signal is processed serially by the elements 82a-82i and elements 90a-90i, it may be desirable to delay the powering of some or all of the elements 98a-98i residing in the TPDC region 96 of transmitter 66 (FIG. 3) for some additional time period, thereby minimizing power consumption and heat generation by the digital transmitter unit 60. The embodiment of the transmitter power manager 62 illustrated in FIG. 6 would be particularly well suited to such a cascading application in that a first delayed control signal could be provided to the TSGC power turn-on transistor 132. Then, a second delayed control signal could be provided to the transmitter power turn-on transistor 134. Furthermore, a plurality of power turn-on transistors (not shown) could be implemented within the power enabling circuitry 130 and be individually coupled to the data detector 136 so that a plurality of time delayed control signals could be provided to a corresponding one of the plurality of power turn-on transistors, thereby providing for cascading control of many elements residing in the digital transmitter unit 60. Any such alternative embodiments of a transmitter power manager 62 employing a plurality of power turn-on transistors having a plurality of delayed control signals such that the selected elements of the digital transmitter unit 60 may be turned-on in a cascading manner are intended to be within the scope of this disclosure and to be protected by the accompanying claims for the present invention.

Data detector 112 was described above as detecting activity in a selected element 90a-90i or a selected connection residing in the TSGC constant power components region 88 (FIG. 7). Alternatively, data detector 112 could be detecting activity in a selected element or a selected connection residing in another component residing in the central office 22 (FIG. 2). For example, data detector 112 may be monitoring activity in an element residing in the signal front end system 32 (FIG. 2). Any such alternative embodiment of a transmitter power manager 62 having the data detector 112 sensing activity in an element or in a connector residing in the central office 22 (FIG. 2) is intended to be within the scope of this disclosure and to be protected by the accompanying claims for the present invention.

In one embodiment, incoming communication data may arrive in the format of a packetized stream of data. Such an embodiment may operate in a communication system employing digital technology, such as, but not limited to, frame relay data, asynchronous transfer mode (ATM), X.25, internet protocol (IP) routed and multiprotocol label switching (MPLS). This packetized digital communication format generally adheres to a model, such as the well known Open Systems Interconnect (OSI) seven-layer model, which specifies the parameters and conditions under which information is formatted into a digital data packet and transferred over a communications network. Typically, a packet of data includes header information in the layer 2 and/or the layer 3 data that specifies, in part, the destination where the incoming communication signal is to be transmitted to. One embodiment of the present invention senses this destination information to identify the transmitter that will be transmitting the incoming communication signal. Thus, the incoming signal can be detected and based upon the destination location, the appropriate transmitter power manager may repower the selected components in the transmitter.

An apparatus and method that enables multiple modems, connected at a premise to a single subscriber line, to simultaneously communicate data with a single modem at the central office end of the subscriber line is described in commonly assigned and co-pending U.S. patent application entitled "APPARATUS AND METHOD FOR A MULTI-POINT DSL MODEM", Ser. No. 09/031,266 filed on, Feb. 26, 1998, herein incorporated by reference. An apparatus and method that allows simultaneously multiple telephone-type services to any/all POTS-type devices on each wire pair and that provides for the ability to add separately addressable POTS devices on a single service loop, by the use of a multipoint protocol or by Frequency Division Multiplexing, is described in commonly assigned and co-pending U.S. patent application entitled "APPARATUS AND METHOD FOR SIMULTANEOUS MULTIPLE TELEPHONE TYPE SERVICES ON A SINGLE TELEPHONE LINE", Ser. No. 09/032,671 filed on, Feb. 27, 1998, herein incorporated by reference.

For convenience of illustration, and for convenience of explaining the operation and functionality of the present invention, elements 82a-82i were shown as residing in the TSGC power-down components region 80. Similarly, elements 90a-90i were shown as residing in TSGC constant power component region 88 and elements 98a-98i were shown as residing in the TPDC region 96 (see FIG. 3). One skilled in the art will appreciate that some or all of the above mentioned elements may not necessarily reside in a predefined or specified region within the device. That is, the above-described elements may be conveniently positioned within the digital transmitter unit 60 based upon a variety of other engineering and design considerations. The operation and functionality of the present invention can be implemented in such a digital transmitter unit 60 by selectively coupling to those elements which are to be controlled by a transmitter power manager 62.

E. Alternative Embodiments of a Transmitter Power Manager

Figure 8:
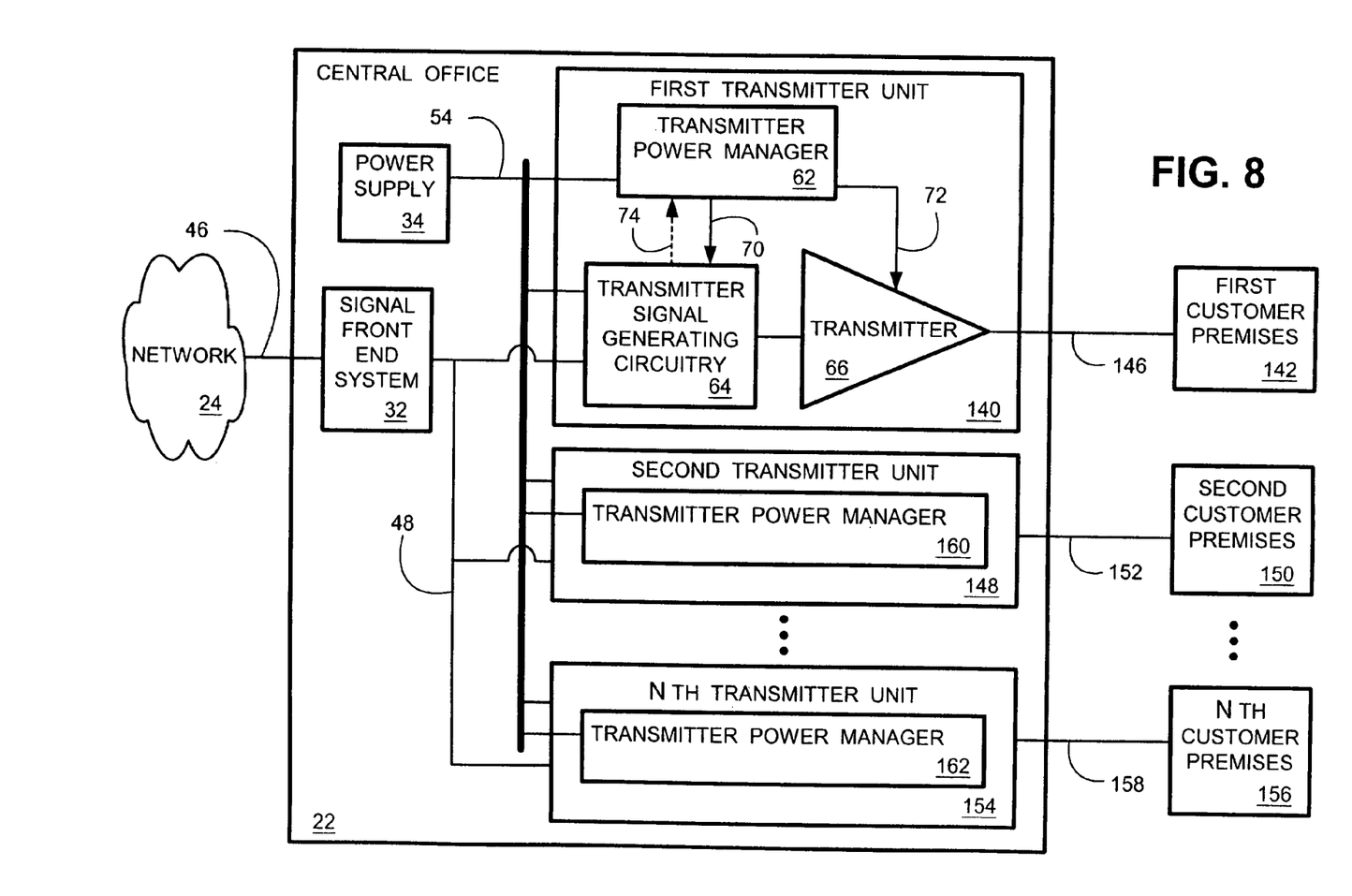
FIG. 8 is a simplified block diagram illustrating a plurality of transmitter power managers employed in a communication transmitter system residing in a central office.

FIG. 8 illustrates an alternative embodiment of the present invention having a plurality of transmitter power managers turning on elements (not shown) residing in a plurality of transmitter units. In a typical central office (CO) 22, many transmitter units would be coupled to a corresponding number of customer premises. A significant overall reduction in power consumption in the plurality of transmitter units residing in the CO 22 may be realized by individually controlling each transmitter unit in a manner described above. As illustrated in FIG. 8, a first transmitter unit 140 is illustrated as transmitting to a first customer premises 142 over subscriber loop 146. Similarly, a second transmitter unit 148 is shown as transmitting to a second customer premises 150 over subscriber loop 152. An $N^{th}$ transmitter unit 154 is shown transmitting to the $N^{th}$ customer premises 156 via subscriber loop 158.

An incoming communication signal coming from network 24 which is intended for the first customer premises 142, arrives at the CO 22, via connection 46, and is received by the signal front end system 32. The incoming communication signal is routed to the transmitter signal generation circuitry 64. According to the present invention, the transmitter power manager 62 detects the incoming communication signal which is to be transmitted to the first customer premises 142, and turns on selected elements residing in the transmitter 66 and/or the transmitter signal generator 64 which had been turned off due to the prior inactivity of the transmitter 66. That is, transmitter power manager 62 fully powers the selected elements upon the detection of the incoming communication signal which is to be transmitted to the first customer premises 142.

Similarly, selected elements residing in the second transmitter unit 148 will be turned off until an incoming communication signal arrives from network 24 which is to be transmitted to the second customer premises 150. Upon arrival of the incoming communication signal which is to be transmitted to the second customer premises 150, the transmitter power manager 160 turns on the associated elements so that the incoming communication signal can be transmitted to the second customer premises 150.

The $N^{th}$ transmitter unit operates similarly to the first transmitter unit and the second transmitter unit described above. Transmitter power manager 162 turns on the selected components residing in the $N^{th}$ transmitter unit 154 upon the detection of an incoming communication signal which is to be transmitted to the $N^{th}$ customer premises 156. Thus, selected elements residing in all of the transmitter units within the CO 22 are powered off during periods of transmitter inactivity, and then appropriately powered on as incoming communication signals are routed to the transmitter unit. One skilled in the art will appreciate that transmitter units employing the system and method of the present invention may realize significant reductions of overall power consumption given the statistical nature of communication signals received from network 24 that are to be transmitted out to specific customer premises.

By reducing overall power consumption of the plurality of transmitter units residing in the CO 22, total heat generated by the aggregation of the transmitter units will be correspondingly reduced. Thus, a more compact construction of the digital communication systems components may be achieved because the maximum heat generation allowed per unit size of floor space and/or per unit size of cabinet volume as specified by code requirements may be maintained.

Figure 9:
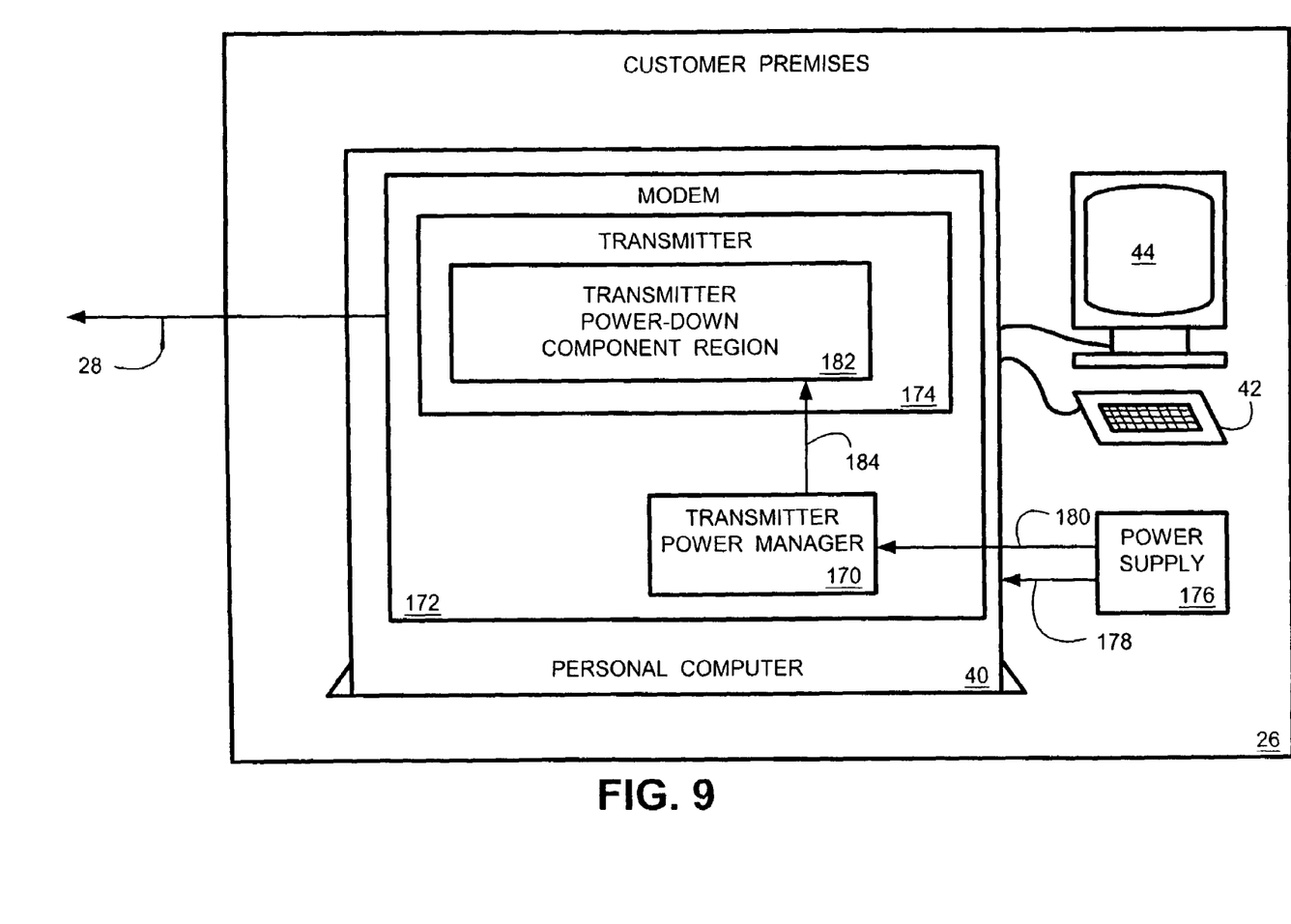
FIG. 9 is a simplified block diagram illustrating the transmitter power manager employed in the PC of FIG. 1.

FIG. 9 illustrates an alternative embodiment of the transmitter power manager 170 residing in the modem 172 of personal computer (PC) 40 at the customer premises 26 (see also FIG. 2). PC 40 would typically have a modem 172 coupled to subscriber loop 28. A transmitter 174 residing in modem 172 would transmit communication signals generated by PC 40 onto subscriber loop 28 for transmission to receivers (not shown) residing in the CO 22 (FIG. 2).

A power supply 176 would be coupled to PC 40 via connection 178. Power supply 176 would also be coupled to the transmitter power manager 170. For convenience of illustration and explanation of the operation and functionality of this alternative embodiment, power supply 176 is shown as residing outside of PC 40 and coupled to the transmitter power manager 170 via connection 180. Alternatively, power supply 176 could reside within PC 40 and/or connection 180 could be alternatively coupled to connection 178 or coupled to the PC 40 power system (not shown) at a convenient location.

When PC 40 is not actively transmitting to the central office receiver (not shown), the transmitter power manager 170 will power down elements (not shown) residing in the transmitter power-down component region 182. When a communication signal generated by PC 40 is to be transmitted, transmitter power manager 170 will provide power, via connection 184, to the elements residing in the transmitter power-down component region 182. Furthermore, the transmitter power manager 170 may be coupled to other elements (not shown) residing in the PC 40 or the modem 172 which are to be powered down during periods of transmitter inactivity.

The above-described embodiments of a transmitter power manager are illustrated and described in the context of a TDM DSL communications network. However, the concepts and principles of the transmitter power manager are equally applicable to TDM versions of ADSL, RADSL, VDSL or a combination of systems having segments employing different formats for each segment. Any such alternative embodiments of a transmitter power manager employed in a communication system employing other communication formats is intended to be within the scope of this disclosure and to be protected by the accompanying claims for the transmitter power manager.

The embodiments described above have been generally described in reference to elements residing in a transmitter system that are powered down during periods of transmitter inactivity. An alternative embodiment of the present invention is configured to control selected elements residing in other components of the communication system in which the transmitter power manager resides. For example, but not limited to, elements residing in a receiver may be selected for powering down during times of transmitter inactivity, and/or may be powered down during times of receiver inactivity. When elements residing in the receiver are powered down, the power manager may be configured to sense activity in selected elements of the receiver and/or transmitter such that incoming communication signals are detected in time so that the power enabling circuitry provides power to the selected elements so that the selected elements are fully powered, stabilized and ready to receive the communication signal.

The embodiments described above have been generally described in reference to a communication system employing subscriber loops. An alternative embodiment present invention is configured to operate in other types of communication systems. For example, but not limited to, elements residing in a mobile wireless communication system transceiver (transmitter and/or receiver) may be selected for powering down during times of transmitter inactivity, and/or may be powered down during times of receiver inactivity. Examples of communication signals employed in wireless systems that could utilize the present invention include, but are not limited to, IS-136, time division multiple access (TDMA) and code division multiple access (CDMA).

It should be emphasized that the above-described "embodiments" of the transmitter power manager, particularly, any "preferred" embodiments, are merely possible examples of implementations, merely set forth for a clear understanding of the principles of the transmitter power manager. Many variations and modifications may be made to the above-described embodiment(s) of the transmitter power manager without departing substantially from the spirit and principles of the transmitter power manager. All such modifications and variations are intended to be included herein within the scope of the transmitter power manager, and be protected by the claims that follow.

Therefore, the following is claimed:

1. A system for controlling power in a communication device, the system comprising,
    a transmitter comprising a first element and a second element;
    a detector configured to detect the presence of an incoming signal for transmission, wherein the incoming signal propagates through the first element and the second element; and
    a transmitter power manager coupled to said detector, said transmitter power manager configured to provide power, in response to the detection, to the first element, and further configured to provide power, after a delay, to the second element, wherein the delay is based on a propagation delay associated with propagation of the incoming signal from the first element to the second element.

2. The apparatus of claim 1, wherein said detector is further configured to generate a control signal in response to the detection, and said transmitter power manager is further configured to provide power to the first and second elements in response to the control signal.

3. The apparatus of claim 1, further comprising:
    transmit signal generating circuitry configured to receive and process said incoming signal; and
    a transmitter coupled to said transmit signal generating circuitry and configured to amplify and transmit said incoming signal,
    wherein the first element resides in the transmit signal generating circuitry, and the second element resides in the transmitter.

4. The apparatus of claim 3, wherein said detector is coupled to said transmit signal generating circuitry.

5. The apparatus of claim 3, wherein said transmit signal generating circuitry comprises a digital signal processor (DSP).

6. The apparatus of claim 1, wherein said detector is further configured to detect the absence of said incoming signal and to remove power, in response to the absence, to at least one of the first and the second element.

7. The apparatus of claim 1, further comprising a power supply, wherein said transmitter power manager comprises:
    a first switchable device coupled to said first element and configured to couple said first element to said power supply in response to the detection; and
    a second switchable device coupled to said second element and configured to couple said second element to said power supply in response to the detection.

8. The system of claim 1, wherein the propagation delay associated with propagation of the incoming signal through a first series of components comprises a propagation delay associated with propagation of the incoming signal from the first element to the second element.

9. The system of claim 1, wherein the first element and the second element reside in a transmitter.

10. The system of claim 1, wherein the delay is based on the propagation delay and a stabilization delay associated with the second element.

11. A communication system, comprising:
    means for amplifying and transmitting said incoming signal, wherein said means for amplifying and transmitting comprises a first element and a second element;
    means for detecting the presence of an incoming signal for transmission, wherein the incoming signal propagates through the first element and the second element; and
    means for providing power to the first element and, after a delay, to the second element, wherein said means for providing power is responsive to the means for detecting, wherein the delay is based on a propagation delay associated with propagation of the incoming signal from the first element to the second element.

12. The system of claim 11, wherein said means for detecting comprises:
means for generating a control signal, wherein said means for generating is responsive to the means for detecting, and wherein said means for providing power is response to the means for generating.

13. The system of claim 11, further comprising:
means for generating a transmit signal, wherein said means for generating a transmit signal is responsive to said means for detecting,
and wherein the first element resides in the means for generating a transmit signal, and the second element resides in means for amplifying and transmitting.

14. The system of claim 13, wherein said means for detecting is coupled to said means for generating a transmit signal.

15. The system of claim 13, wherein said means for generating a transmit signal comprises a digital signal processor (DSP).

16. The system of claim 11, wherein said means for detecting comprises:
means for detecting the absence of said incoming signal; and
means for removing power to at least one of the first and the second element, said means for removing power responsive to the absence.

17. The system of claim 11, further comprising a power supply, wherein said transmitter power manager comprises:
a first switchable device coupled to said first element and configured to couple said first element to said power supply in response to the detection,
a second switchable device coupled to said second element and configured to couple said second element to said power supply in response to the detection.

18. The system of claim 11, wherein the propagation delay associated with propagation of the incoming signal through a first series of components comprises a propagation delay associated with propagation of the incoming signal from the first element to the second element.

19. The system of claim 11, wherein the first element and the second element reside in said means for amplifying and transmitting.

20. The system of claim 11, wherein the delay is based on the propagation delay and a stabilization delay associated with the second element.

21. A method for controlling power in a communication device, the method comprising:
detecting the presence of an incoming signal for transmission, wherein the incoming signal propagates through a first element and a second element;
providing power, in response to the detection, to the first element; and
providing power, after a predefined delay, to the second element, wherein the delay is based on a propagation delay associated with propagation of the incoming signal from the first element to the second element.

22. The method of claim 21, further comprising:
generating a control signal in response to the presence of said incoming signal; and
providing power to the first and second elements in response to the control signal.

23. The method of claim 21, further comprising the steps of:
detecting the absence of said incoming signal; and removing power, in response to the absence, to at least one of the first and the second element.

24. The method of claim 21, wherein the predefined delay is based on the stabilization time of the first element.

25. The method of claim 21, wherein the predefined delay is based on the stabilization time of the first element as compared to the stabilization time of the second element.

26. The method of claim 21, wherein the propagation delay associated with propagation of the incoming signal through a first series of components comprises a propagation delay associated with propagation of the incoming signal from the first element to the second element.

27. The method of claim 21, wherein the first element and the second element reside in a transmitter.

28. The method of claim 21, wherein the delay is based on the propagation delay and a stabilization delay associated with the second element.

* * * * *